(12) United States Patent
Kaplan et al.

(10) Patent No.: US 10,929,141 B1
(45) Date of Patent: Feb. 23, 2021

(54) SELECTIVE USE OF TAINT PROTECTION DURING SPECULATIVE EXECUTION

(71) Applicant: ADVANCED MICRO DEVICES, INC., Santa Clara, CA (US)

(72) Inventors: David Kaplan, Austin, TX (US); Marius Evers, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 18 days.

(21) Appl. No.: 16/293,266

(22) Filed: Mar. 5, 2019

Related U.S. Application Data

(60) Provisional application No. 62/639,179, filed on Mar. 6, 2018, provisional application No. 62/698,677, filed on Jul. 16, 2018.

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01)

(58) Field of Classification Search
None
See application file for complete search history.

(56) References Cited

U.S. PATENT DOCUMENTS

| | | | | |
|---|---|---|---|---|
| 5,367,648 A | * | 11/1994 | Chuang | G06F 9/30043 711/143 |
| 5,778,219 A | * | 7/1998 | Amerson | G06F 9/30189 712/244 |
| 6,301,705 B1 | * | 10/2001 | Doshi | G06F 9/3842 712/208 |
| 6,374,333 B1 | * | 4/2002 | Arimilli | G06F 12/0831 711/121 |
| 6,675,192 B2 | * | 1/2004 | Emer | G06F 9/30087 718/107 |
| 6,766,447 B1 | * | 7/2004 | Jue | G06F 9/4403 711/119 |
| 7,114,059 B2 | | 9/2006 | Wilkerson | |
| 7,398,390 B2 | | 7/2008 | Hyster | |
| 7,613,911 B2 | | 11/2009 | Burdass | |

(Continued)

OTHER PUBLICATIONS

Chen, H., etal., From Speculation to Security: Practical and Efficient Information Flow Tracking Using Speculative Hardware, IEEE, pp. 401-412. (Year: 2008).*

(Continued)

*Primary Examiner* — Eric Coleman

(57) ABSTRACT

A state of a first architectural register in a processing system is changed from a first state to a second state that indicates that the first architectural register is to be monitored during speculative execution. A second architectural register in the processing system is associated with a third state in response to the first architectural register being a source register for a memory load instruction that loads data from a memory into the second architectural register during speculative execution. Use of data in the second architectural register is constrained during speculative operations while the second architectural register is in the third state. In some cases, a "set taint" instruction is executed to change the state of the first architectural register from the first state to the second state.

22 Claims, 6 Drawing Sheets

(56) References Cited

U.S. PATENT DOCUMENTS

| | | | |
|---|---|---|---|
| 7,788,235 B1 | 8/2010 | Yeo | |
| 8,789,169 B2 | 7/2014 | Otani et al. | |
| 8,918,626 B2* | 12/2014 | Chou | G06F 9/383 |
| | | | 712/218 |
| 8,959,318 B2 | 2/2015 | Grisenthwaite | |
| 2007/0118696 A1* | 5/2007 | McCauley | G06F 12/0862 |
| | | | 711/137 |
| 2008/0216175 A1 | 9/2008 | Pike | |
| 2009/0172644 A1 | 7/2009 | Nagarajan et al. | |
| 2011/0145918 A1 | 6/2011 | Jung et al. | |
| 2011/0314342 A1* | 12/2011 | Gilkerson | G06F 11/3476 |
| | | | 714/45 |
| 2013/0086365 A1 | 4/2013 | Gschwind et al. | |
| 2014/0237614 A1 | 8/2014 | Irvine | |
| 2015/0128262 A1* | 5/2015 | Glew | G06F 21/577 |
| | | | 726/23 |
| 2016/0098274 A1* | 4/2016 | Loewenstein | G06F 11/0757 |
| | | | 712/225 |
| 2016/0232346 A1 | 8/2016 | Paddon et al. | |
| 2017/0177472 A1* | 6/2017 | Frazier | G06F 12/0269 |
| 2017/0371667 A1* | 12/2017 | Fei | G06F 9/30145 |

OTHER PUBLICATIONS

U.S. Appl. No. 16/293,154, filed Mar. 5, 2019, listing David Kaplan, et al. as inventors, entitled, "Taint Protection During Speculative Execution,", 51 pages.

Non-Final Office Action dated Jul. 2, 2020 for U.S. Appl. No. 16/293,154, 32 pages.

* cited by examiner

SELECTIVE USE OF TAINT PROTECTION DURING SPECULATIVE EXECUTION

CROSS REFERENCE TO RELATED APPLICATIONS application claims priority to the U.S. Provisional Patent Application Ser. No. 62/639,179 filed on Mar. 6, 2018 and entitled "Managing Speculation Side-Channels Through Hardware Tainting," which is hereby incorporated by reference in its entirety. This application also claims priority to the U.S. Provisional Patent Application Ser. No. 62/698,677 filed on Jul. 16, 2018 and entitled "Taint Protection During Speculative Execution," which is hereby incorporated by reference in its entirety. This application is also related to U.S. patent application Ser. No. 16/293,154 filed on Mar. 5, 2019 and entitled "Taint Protection During Speculative Execution."

BACKGROUND

Speculative execution of instructions is used to enhance performance of processing systems. For example, a processing unit can predict the outcome of a branch instruction using information in a branch prediction structure. Speculative execution of subsequent instructions along the predicted branch is performed before the processing unit has evaluated the branch instruction. If the predicted branch turns out to be incorrect when the processing unit evaluates the branch instruction, speculative execution along the incorrectly predicted branch is suspended and the state of the processing unit is rolled back to the state at the branch instruction. After the rollback, execution resumes along the correct branch. Examples of branch prediction structures used in such branch prediction operations include indirect branch predictors that redirect the flow of the program to an arbitrary instruction, a return address stack that includes return addresses for subroutines executing on the processing unit, and a branch target buffer that includes information for predicting the presence and target addresses of branch instructions. Some implementations of branch prediction structures use a branch history of the results of branch instructions executed by processes that were previously, or are currently, executing on the processing unit as part of the prediction algorithm.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
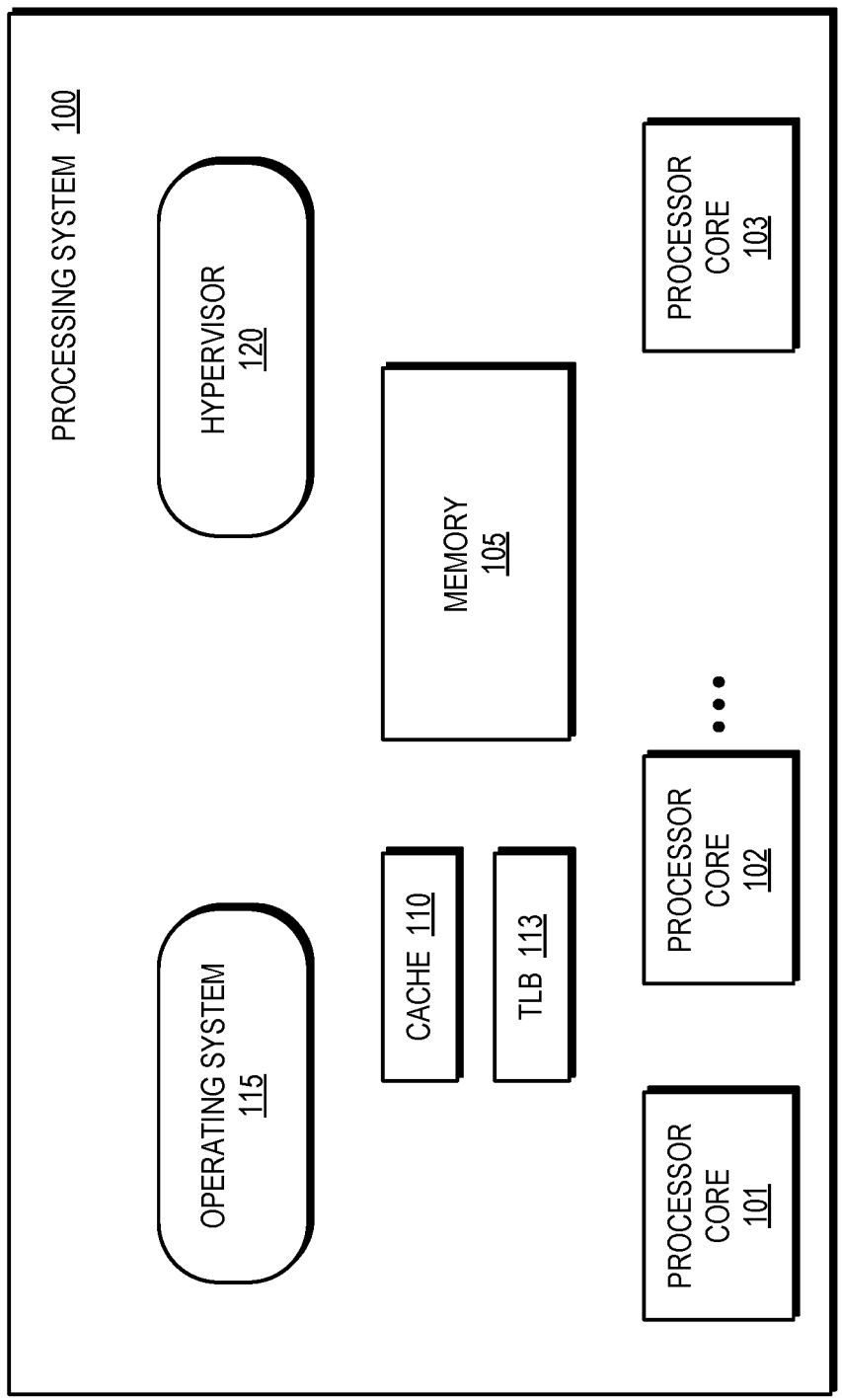
FIG. 1 is a block diagram of a processing system that implements speculative execution taint protection according to some embodiments.

Although speculative execution improves performance by commencing execution of predicted future instructions prior to the completion of "older" instructions, the speculative execution of certain instructions, such as memory loads, may cause side effects on caches and other microarchitectural states. As used herein, the term "side effect" refers to any change in a state of the processing system that is not undone or reverted by a pipeline flush, e.g., as performed on a branch redirection following a misprediction. Examples of side effects include a cache fill, a cache eviction, and a translation lookaside buffer (TLB) insertion. In certain cases, the side effect causes a microarchitectural state change that creates a side channel that allows information to leak from one entity to another. This side channel is of particular concern when a trusted entity provides services to an untrusted program. For example, during a system call, the control flow crosses a hardware privilege boundary between kernel space and user space, which may cause the processor to consume or use untrusted values that are provided from the user space, e.g., via user-controlled registers. Unintended information leakage can result if a processor consumes or uses untrusted values provided by the untrusted program during speculative execution. The processing system can reduce side effects by marking (or "tainting") architectural registers to constrain speculative use of data in the tainted registers, e.g., preventing speculative execution of operations that use a tainted register as a source register. However, constraining the speculative use of all tainted architectural registers can significantly reduce the performance gains achieved by speculative execution.

FIGS. 1-6 disclose example embodiments of a processing system that is protected from side effects during speculative execution, while preserving many of the performance gains of speculative execution, by changing a state of a first architectural register from a first (untainted) state to a second (tainted) state to indicate that the first architectural register is to be monitored during speculative execution. In some embodiments, the state is changed from the first state to the second state using a "set taint" instruction defined in an instruction set architecture (ISA) implemented by the processing system. The processing system uses data stored in the tainted first architectural register in the same manner as untainted architectural registers during speculative execution. A state of a second architectural register is changed to a third (danger) state in response to the tainted first architectural register being used in a memory load instruction that loads data from a memory into the second architectural register. Data in the second architectural register is not used in speculative operations that cause side effects while the second architectural register remains in the third state. States of architectural registers change in response to retirement of instructions that use the architectural registers as destination registers. For example, the state of the second architectural register is changed to the second state in response to retirement of the memory load instruction that loaded data into the second architectural register. Data in the second architectural register can be used in speculative operations after the second architectural register transitions to the second state.

In some embodiments, dependency tracking is used to monitor states of architectural registers and determine whether to constrain operations performed using the architectural registers. For example, a renamer marks (or tags) the second architectural register with a number of an entry in a reorder buffer associated with the first architectural register in response to changing the state of the second architectural register to the third state. The second architectural register transitions to the second (tainted) state in response to a retirement unit (or reorder buffer, ROB) providing the number to an execution unit, which indicates to the execution unit that the corresponding entry has retired. The execution unit begins using the second architectural register during speculative execution in response to detecting the number provided by the retirement unit or ROB. A fourth (clear danger) state is assigned to architectural registers that are in the third state but will revert to the first state upon retirement of an instruction operating on the architectural register, such as a "clear taint" instruction. The state of an architectural register transitions from the third state to the first state in response to retirement of the clear taint instruction, e.g., as indicated by reception of a corresponding number of an entry in the reorder buffer.

FIG. 1 is a block diagram of a processing system 100 that implements speculative execution taint protection according to some embodiments. The processing system 100 implements one or more processor cores 101, 102, 103, which are collectively referred to herein as "the processor cores 101-103." The processor cores 101-103 execute applications (e.g., as represented by sequences of instructions or operations) that are stored in a memory 105. Some embodiments of the memory 105 are implemented as dynamic random access memory (DRAM). The processor cores 101-103 access the instructions using physical addresses, virtual addresses, or addresses of cache lines in embodiments that implement caching of instructions in a cache 110 or other portions of a cache hierarchy such as caches implemented in the processor cores 101-103. The processing system 100 also includes a translation lookaside buffer (TLB) 113 that stores frequently used mappings of virtual addresses to physical addresses. Results of the instructions executed by the processor cores 101-103 are stored in the memory 105. The processor cores 101-103 execute instructions sequentially, concurrently, or in parallel with each other. The privilege level of a process executing on one of the processor cores 101-103, the guest/hypervisor status of the process and other context state are known and controlled by a management layer including an operating system (OS) 115 for the processing system 100 or a hypervisor 120 of one or more virtual machines that are executing in the processing system 100.

Figure 2:
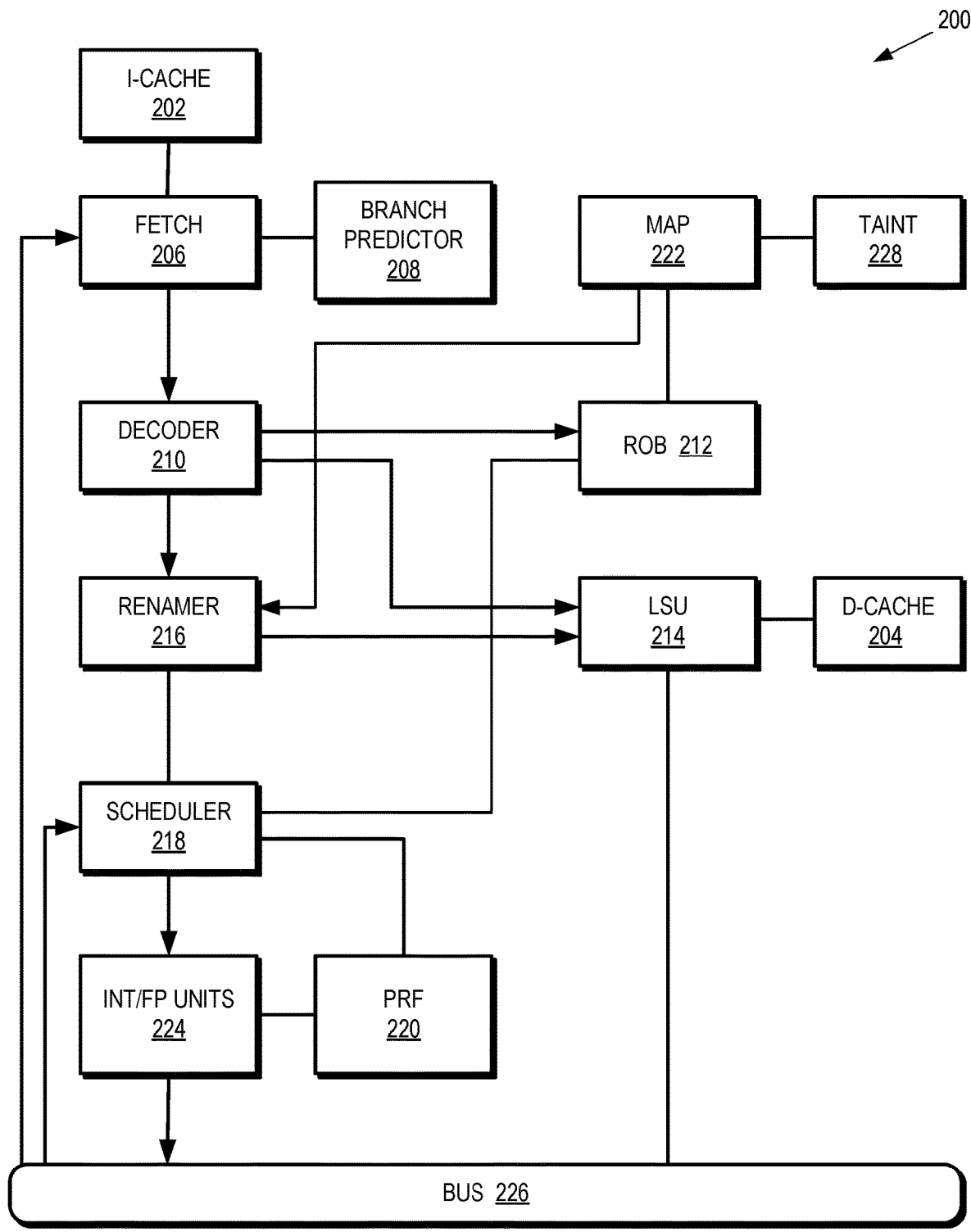
FIG. 2 is a block diagram of a processor core according to some embodiments.

FIG. 2 is a block diagram of a processor core 200 according to some embodiments. The processor core 200 is used to implement some embodiments of the processor cores 101-103 shown in FIG. 1. Some embodiments of the processor core 200 include circuitry for executing instructions according to a predefined instruction set and are implemented in a single-processor configuration or in a multi-processor configuration.

The processor core 200 includes an instruction cache (I-cache) 202 to store instructions for a software application and a data cache (D-cache) 204 to store data used in computations performed by the instructions. In some instances, the I-cache 202 and the D-cache 204 are implemented together as a unified cache or as part of a hierarchy of caches such as L1 and L2 cache structures. The processor core 200 further includes an instruction fetch unit 206 for fetching one or more instructions from the I-cache 202. The fetch unit 206 may include a program counter (PC) register that holds a pointer to an address of the next instructions to fetch from the I-cache 202.

A branch prediction unit 208 is coupled to the fetch unit 206 and predicts results of instructions that change the flow of an instruction stream from executing a next sequential instruction, e.g., branch instructions. A branch instruction is conditionally executed depending on how the flow of control is altered at the branch point. For example, an IF(A)-THEN(B)-ELSE(C) statement is a branch instruction that directs the program flow down the path represented by branch B if the condition A is satisfied. Otherwise, this instruction directs the program flow down the path represented by branch C. The branch prediction unit 208 predicts whether the condition A is satisfied before the instruction is executed to evaluate the condition A. Instructions down the path represented by branch B are speculatively dispatched and executed if the branch prediction unit 208 predicts that the condition A is satisfied. Instructions down the path represented by branch C are speculatively dispatched and executed if the branch prediction unit 208 predicts that the condition A is not satisfied. Some embodiments of the branch prediction unit 208 include a branch target buffer (BTB) or indirect target predictor.

A decoder 210 implemented in the processor core 200 decodes the opcodes of the fetched instructions. Some embodiments of the decoder 210 divide a single instruction into two or more micro-operations (micro-ops). The micro-ops are processed by subsequent pipeline stages and executed in program order or out-of-order. However, the micro-ops are not committed until each micro-op corresponding to an original instruction is ready. As used herein, a reference to the processing of an "instruction" in the processor core 200 refers to the processing of the instruction as whole or to the processing of an individual micro-op comprised within the instruction. The decoder 210 allocates entries in a reorder buffer (ROB) 212, which may also be referred to as an in-order retire queue or retirement unit. Some embodiments of the decoder 210 also allocates entries in reservation stations, in a load/store unit (LSU) 214, or in other locations. In the example shown, a reservation station includes a renamer 216 and a scheduler 218, which are shown as separate units. The flow of instructions from the decoder 210 to the allocation of entries in the renamer 216 is referred to as the dispatch of instructions.

The renamer 216 performs register renaming for the fetched instructions, e.g., mapping or "renaming" the architectural registers used by the instructions into tags that refer to physical registers in a physical register file (PRF) 220. An architectural state map (MAP) 222 stores the mapping of the logical or architectural register numbers to the associated physical register numbers that indicate the physical registers in the physical register file 220. A new physical register is allocated from the physical register file 220 in response to each write to a logical architectural register. The architectural state map 222 therefore stores a snapshot of the mappings in the processor core 200 at a given point in the program. In some embodiments, the architectural state map 222 includes multiple maps or checkpoints such as a dispatch map, a retire map, and one or more checkpoints that are used to roll back the state of the processor core 200, e.g., in response to a branch misprediction. The dispatch map tracks the current mappings at dispatch time and is used to "rename" the logical/architectural register identifier to the physical register entry. The retire map stores the mapping associated with retired state. Some embodiments of the architectural state map 222 are therefore distributed across different locations within the processor core 200.

The state of the processor core 200 is indicated by values stored in general-purpose registers in the physical register file 220. For example, the state of the processor core 200 may be represented by the architectural state map 222 and the contents of the physical register file 220. Some embodiments of the architectural state map 222 include representations of the committed state of the processor core 200 and the speculative state of the processor core 200, e.g., they include general purpose registers that store values that represent the committed or speculative states of the processor core 200.

Once decoded and renamed, instructions are ready to be scheduled for execution. The scheduler 218 acts as an instruction queue where instructions are stored in entries and wait until their operands become available in the corresponding source registers. When operands are available and hardware resources are also available, an instruction is issued from the scheduler 218 to the integer and floating-point functional units 224 or the load/store unit 214 for execution. Some embodiments of the functional units 224 include arithmetic logic units (ALUs) for computational calculations such as addition, subtraction, multiplication, division, and square root. For example, mathematical operations such as addition, subtraction, multiplication, division, transcendental operations, and the like are dispatched to the integer/floating-point functional units 224. Load operations that load a value from a memory into a physical register and the physical register file and store operations that store a value from a physical register to a location in the memory are dispatched to the load/store unit 214. Upon completion of an instruction, the scheduler 218 signals completion and a fault status for the instruction to the ROB 212.

In the event of a fault, the ROB 212 provides fault signals to the scheduler 218 to identify and clear speculative instructions along incorrectly predicted paths. Some embodiments of the scheduler 218 include compare logic to compare retire queue identifiers of incorrect speculative instructions to identifiers of entries in the scheduler 218 for clearing incorrect speculative instructions. Flush recovery updates are also sent from the ROB 212 to the renamer 216, e.g., when the ROB 212 frees one or more entries in the physical register file 220 for use by the renamer 216. In some embodiments, a rename bus between the ROB 212 and the renamer 216 may include four ports that can each write entries in the renamer 216, e.g. to support flush recovery for four instructions in parallel. The architectural state map 222 is copied to the renamer 216 for flush recovery when retirement of instructions in the ROB 212 has caught up to the flush.

Results from the functional units 224 or the load/store unit 214 are presented on a common data bus 226. In some embodiments, the results are written to the PRF 220 from the INT/FP units 224 in response to the instruction completing execution. The results can also be forwarded to any dependent operations that use the results. The results are also sent to the ROB 212 where the instruction receives its results and is marked for retirement. Instructions in the ROB 212 are retired in-order and a head-of-queue pointer is adjusted to the subsequent instruction in program order as each instruction is retired.

The processor core 200 is protected from side effects that can occur during speculative execution by constraining speculative execution of instructions based on tainting information stored in a taint data structure 228. Entries in the taint data structure 228 are associated with entries in the architectural state map 222. In the illustrated embodiment, the taint data structure 228 is a separate entity that is connected to the architectural state map 222. However, some embodiments of the architectural state map 222 implement the taint data structure 228 as an integral portion of the mapping of architectural registers to physical registers. The state of the architectural registers stored in the taint data structure 228 include a normal state, a tainted state that indicates that the corresponding architectural register is to be monitored during speculative execution, a danger state that indicates that use of data in a corresponding architectural register is constrained during speculative operations, and a clear-danger state indicating that the state of the corresponding architectural register changes from the clear-danger state to the normal state in response to retirement of a "clear taint" instruction that operates on the corresponding architectural register.

In operation, state of the architectural registers are modified in response to events including a memory load that uses a tainted architectural register as a source register, other operations on source registers in different states, retirement of instructions, execution of "set taint" or "clear taint" instructions, and the like. Some embodiments of the processor core 200 change a state of a first architectural register from the normal state the taint state in response to a "set taint" instruction that operates on the first architectural register. A second architectural register is associated with the danger state in response to the first architectural register being a source register for a memory load instruction that loads data from a memory into the second architectural register during speculative execution. Use of data in the second architectural register is then during speculative operations while the second architectural register is in the third state. Transitions between the states of the architectural registers are determined using a state machine, which is disclosed in detail below.

Figure 3:
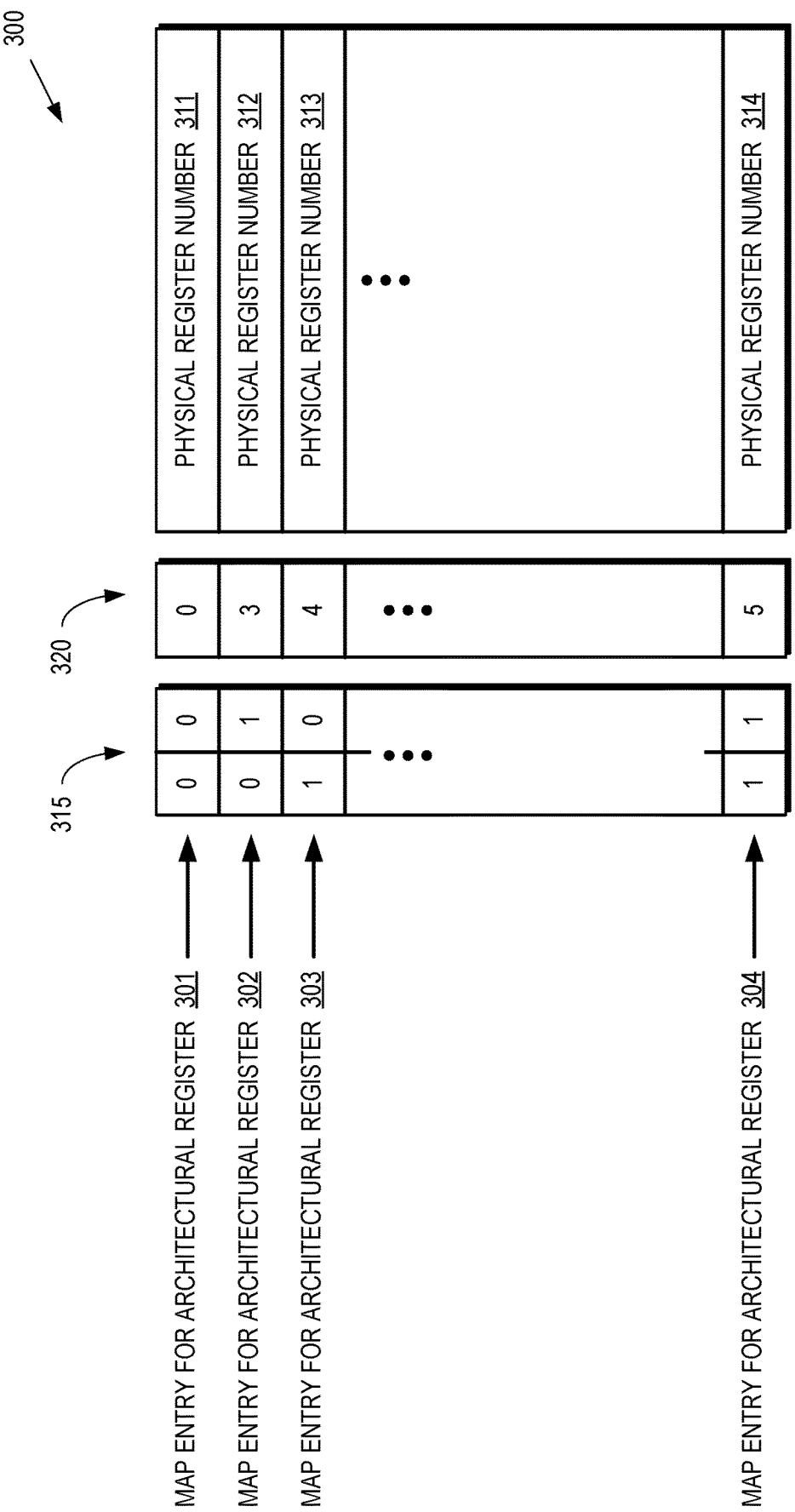
FIG. 3 is a block diagram of an architectural state map according to some embodiments.

FIG. 3 is a block diagram of an architectural state map 300 according to some embodiments. The architectural state map 300 is used to implement some embodiments of the architectural state map 222 shown in FIG. 2. The architectural state map 300 includes architectural register entries 301, 302, 303, 304 that are collectively referred to herein as "the architectural register entries 301-304." The architectural register entries 301-304 map architectural registers to corresponding physical register numbers 311, 312, 313, 314, which are collectively referred to herein as "the physical register numbers 311-314." The physical register numbers 311-314 are pointers or numbers that indicate physical registers in a physical register file such as the physical register file 220 shown in FIG. 2.

The architectural state map 300 includes a taint data structure 315 such as the taint data structure 228 shown in FIG. 2. The taint data structure 315 is an integral part of the architectural state map 300. However, in some embodiments, the taint data structure 315 is implemented external to the architectural state map 300. The taint data structure 315 includes sets of bits that are set to different values to indicate the state of the corresponding architectural registers associated with the architectural register entries 301-304. For example, the bits in the taint data structure 315 associated with the architectural register 301 are set to a value of "00" to indicate that the architectural register 301 is in a first (normal) state, the bits in the taint data structure 315 associated with the architectural register 302 are set to a value of "01" to indicate that the architectural register 302 is in a second (taint) state, the bits in the taint data structure 315 associated with the architectural register 303 are set to a value of "10" to indicate that the architectural register 303 is in a third (danger) state, and the bits in the taint data structure 315 associated with the architectural register 304 are set to a value of "11" to indicate that the architectural register 304 is in a fourth (clear-danger) state.

Some embodiments of the architectural state map 300 include additional tags 320 that are associated with the architectural register entries 301-304 and the corresponding physical register numbers 311-314. The values of the tag 320 are used to perform dependency tracking of the architectural registers 301-304, e.g., to track the dependency of the state of the architectural registers associated with the architectural register entries 301-304 on in-flight instructions that have not yet retired. A renamer such as the renamer 216 shown in FIG. 2 marks (or tags) the architectural registers associated with the architectural register entries 301-304 with numbers that indicate entries in a reorder buffer (such as the ROB 212 shown in FIG. 2). The values of the tags identify in-flight instructions that have a dependency relationship with the corresponding architectural register. For example, the tag in the taint data structure 315 associated with the architectural register entry 303 indicates that the corresponding architectural register is in the danger state (as indicated by the "10" value) until an instruction indicated by the ROB entry number 4 retires. As discussed below, a functional unit in a processor core (such as the LSU 214 shown in FIG. 2) does not speculatively execute instructions that utilize the architectural register 303 in the danger state until the functional unit detects a signal representing the ROB entry number 4, such as a signal generated by the renamer 216 in response to retirement of the instruction corresponding to the ROB entry number 4. Use of the tags 320 is disclosed in more detail below.

In some embodiments, processing systems include multiple copies of the architectural state map 300. For example, a processing system can include a copy of the architectural state map 300 for use during dispatch, another copy for use during retirement, and other copies that optional checkpoints in the processing system. Multiple copies of the structures 315 and 320 are therefore also included in or associated with the multiple copies of the architectural state map. The copies of the structures 315 and 320 are recovered in similar way when responding to flushes due to branch mispredictions, exceptions, or other causes.

Figure 4:
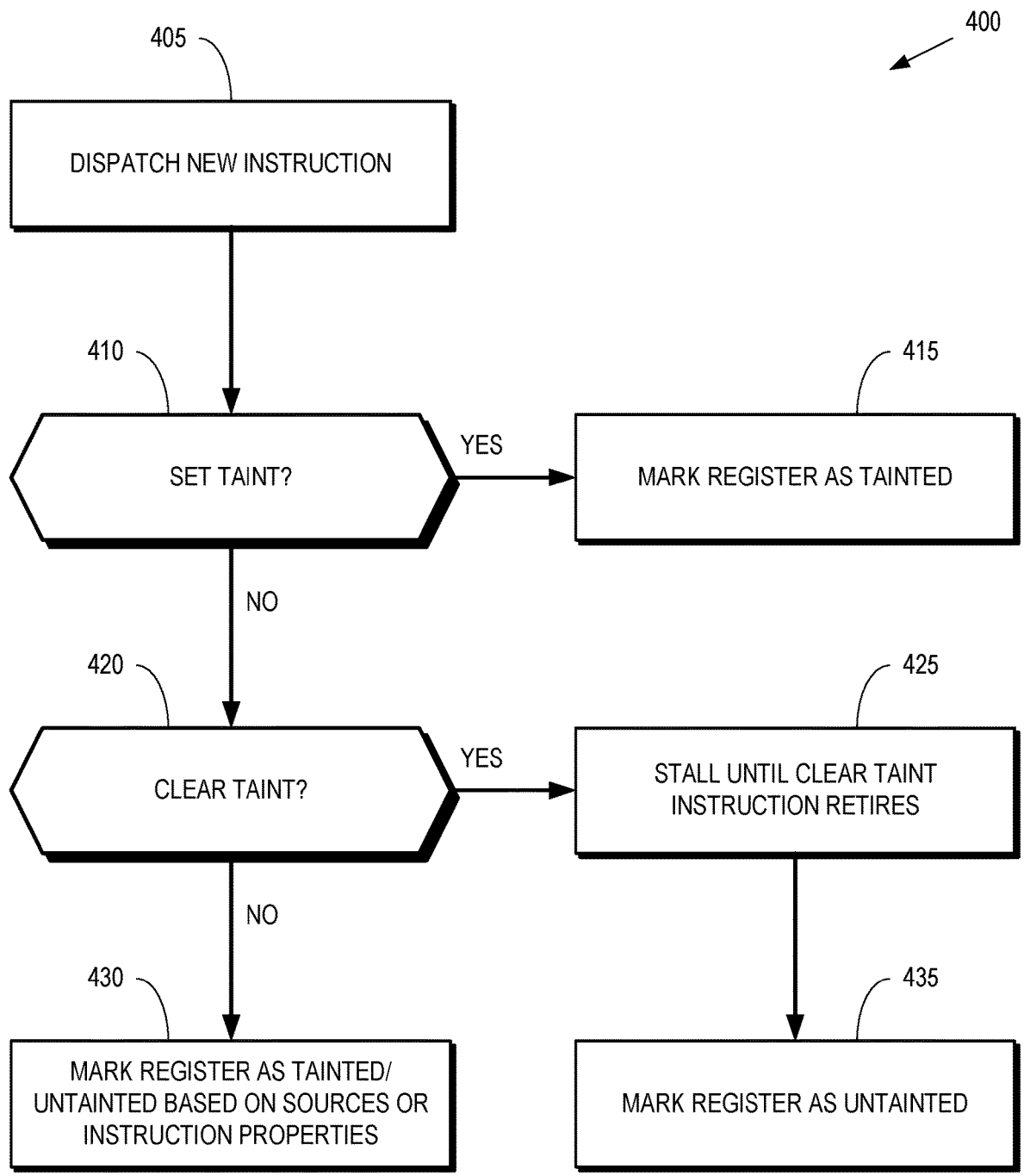
FIG. 4 is a flow diagram of a method of managing the taint status of an architectural register according to some embodiments.

FIG. 4 is a flow diagram of a method 400 of managing the taint status of an architectural register according to some embodiments. The method 400 is implemented in some embodiments of the processing system 100 shown in FIG. 1 and the processor core 200 shown in FIG. 2.

At block 405, a new instruction is dispatched for execution in a processor core. The architectural register is the destination register of the new instruction. The instruction could be an instruction that is used to taint the architectural register (e.g., a "set taint" instruction), an instruction that is used to clear the tainting of the architectural register (e.g., a "clear taint" instruction), or another type of instruction that uses one or more source registers to produce a value that is stored in the (destination) architectural register.

At decision block 410, the processor core determines whether the instruction is used to taint an architectural register. If the instruction is a "set taint" instruction that is applied to the architectural register, the method 400 flows to block 415 and the architectural register is tainted. For example, values of bits in a taint data structure such as the taint data structure 228 shown in FIG. 2 and the taint data structure 315 shown in FIG. 3 are set to values that indicate that the corresponding architectural register is tainted. In some embodiments, speculative use of the data in the tainted architectural register is not constrained and the data can be used in the same manner as normal data. If the instruction is not used to taint the architectural register, the method 400 flows to block 420.

At decision block 420, the processor core determines whether the instruction is used to clear the tainting of an architectural register. If the instruction is a "clear taint" instruction that is applied to the architectural register, the method 400 flows to block 425. If the instruction is not used to clear the tainting of the architectural register, the method 400 flows to block 430.

At block 425, dispatch of the instruction is halted or stalled until the clear taint instruction becomes non-speculative, e.g., until the clear taint instruction retires. Retirement of the clear taint instruction changes the status of the architectural register back to normal, as discussed herein. In response to retirement of the clear taint instruction, the method 400 flows to block 435 and the architectural register is marked as untainted.

At block 430, the processor core has determined that the new instruction is not a "set taint" or "clear taint" instruction. As discussed above, the architectural register is the destination register of the instruction. The architectural register is therefore marked as tainted or untainted based on properties of the source registers or properties of the instruction. In some embodiments, the architectural register is marked as tainted if any of the source registers for the instruction are tainted. If none of the source registers are tainted, the architectural register is marked as untainted, e.g. normal. The state of the architectural register is also set to the normal, untainted state if the instruction is known to clear the contents of the architectural register. An example of an instruction that clears the architectural register is an exclusive-OR of the register with itself, e.g., the architectural register rax is cleared by the operation xor rax, rax.

As discussed above, in some embodiments, a tainted register is used in speculative execution like any other register. However, if a tainted register is used in a memory load instruction, the result of that memory load is considered dangerous. Dangerous values are handled with care because their contents should not be used in ways that can cause side effects. In some embodiments, the hardware manages danger states automatically without any software intervention. Registers are only marked danger during speculative execution of the corresponding instructions. Once the instructions retire, the state of the architectural register is changed to the tainted state.

Figure 5:
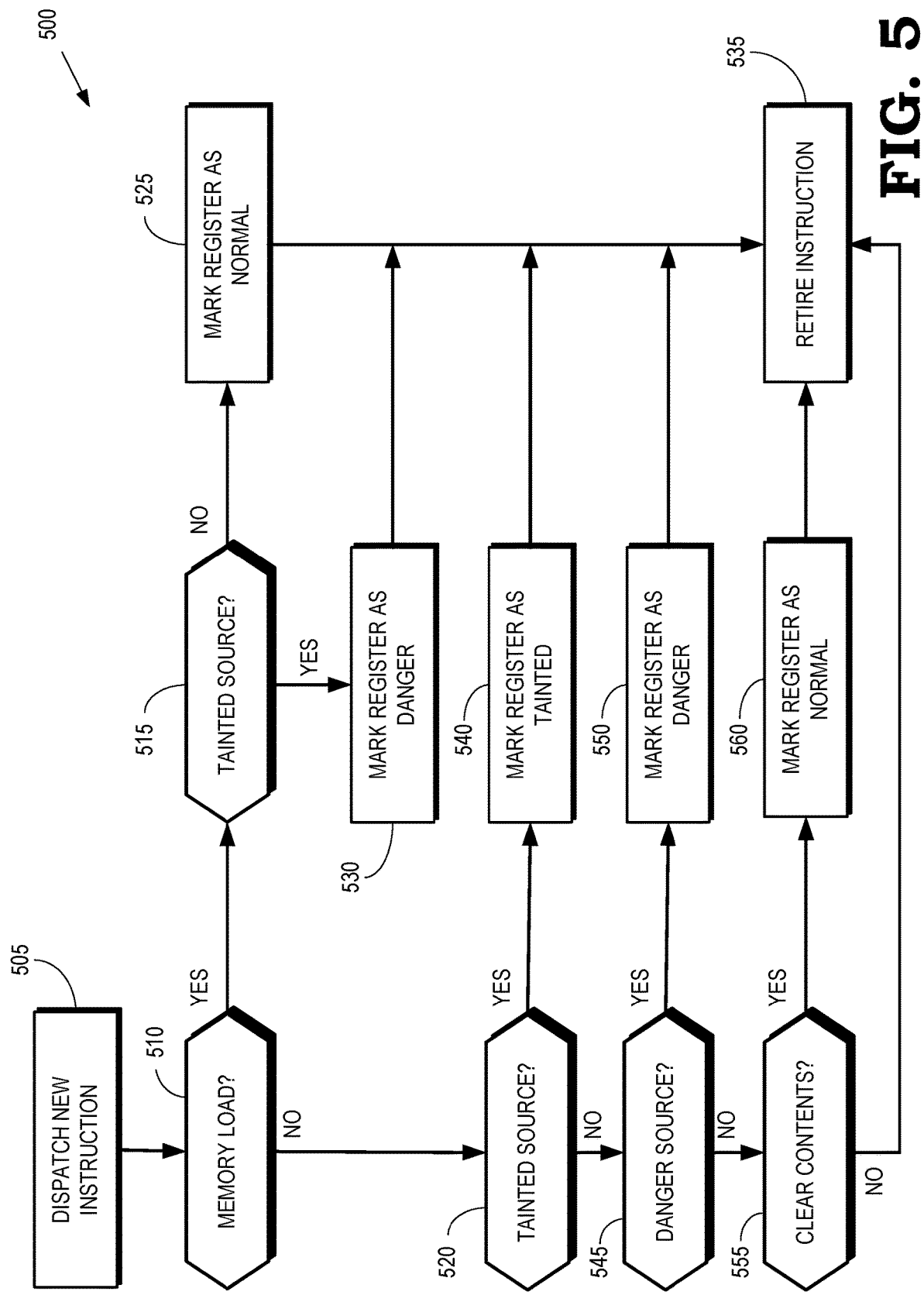
FIG. 5 is a flow diagram of a method of managing the normal, taint, danger, and clear-danger statuses of an architectural register according to some embodiments.

FIG. 5 is a flow diagram of a method 500 of managing the normal, taint, danger, and clear-danger statuses of an architectural register according to some embodiments. The method 500 is implemented in some embodiments of the processing system 100 shown in FIG. 1 and the processor core 200 shown in FIG. 2.

At block 505, a new instruction is dispatched for execution in a processor core. The architectural register is the destination register of the new instruction.

At decision block 510, the processor core determines whether the new instruction is a memory load instruction that loads data from a memory location to the architectural register. If so, the method 500 flows to decision block 515. If the new instruction is not a memory load instruction, the method 500 flows to decision block 520.

At decision block 515, the processor core determines whether one or more source registers of the memory load instruction are tainted. If not, the method 500 flows to block 525 and the architectural register is marked as being in the normal state. If one of the source registers is tainted, the method 500 flows to the block 530 and the architectural register is marked as being in the danger state. The method 500 then flows to block 535.

At decision block 520, the processor core determines whether one or more source registers of the new instruction is marked as being in the tainted state. If so, the method 500 flows to block 540 and the architectural register is also marked as being in the tainted state. The method 500 then flows to block 535. If none of the source registers of the new instruction are in the danger state, the method 500 flows to decision block 545.

At decision block 545, the processor core determines whether one or more source registers of the new instruction is marked as being in the danger state. If so, the method 500 flows to block 550 and the architectural register is also marked as being in the danger state. The method 500 then flows to block 535. If none of the source registers of the new instruction are in the danger state, the method 500 flows to decision block 555.

At decision block 555, the processor core determines whether the new instruction clears the contents of the architectural register. As discussed above, an example of an instruction that clears the architectural register is an exclusive-OR of the register with itself, e.g., the architectural register rax is cleared by the operation xor rax, rax. If the new instruction clears the contents of the architectural register, the method 500 flows to block 560 and the destination register is marked as being in the normal state. The method 500 then flows to block 535. If the new instruction does not clear the contents of the architectural register, the method 500 flows directly to the block 535.

At block 535, the new instruction retires. If the architectural register was marked as being in the danger state, the state of the architectural register is returned to the tainted state in response to retirement of the instruction.

Different embodiments of processing systems (such as the processing system 100 shown in FIG. 1) implement taint tracking and danger tags in different ways. The phrase "dangerous data" is used herein to refer to data that is stored in a physical register that maps to an architectural register in the danger state. Examples of implementation options include preventing memory speculation of dangerous data (option 1), preventing observable memory speculation of dangerous data (option 2), and dependency tracking (option 3).

In option 1, memory speculation using or based on dangerous data is prevented by disallowing all load/store operations using dangerous source data in their address to proceed until they become non-speculative. For example, speculative instructions are disallowed for the load/store unit 214 shown in FIG. 2 until the instructions become non-speculative. Because the danger status of registers is known at dispatch time, a renamer such as the renamer 216 shown in FIG. 2 can pass this information to the load/store unit to instruct the load/store unit to stall execution until the operation is known to execute. While this approach is simple, it is likely to have a larger performance impact than the other options described herein. Scenarios such as walking a tainted linked list would be most impacted.

In option 2, observable memory speculation is prevented by allowing dangerous data to be used in speculative operations if the execution unit can stop execution in response to detecting a potential side effect. For example, the load/store unit can be allowed to execute operations using dangerous data speculatively if the load/store unit can stop itself if a noticeable side effect is expected to occur. For instance, if the operation hits in a TLB and L1 cache, it may be allowed to proceed. However, if the operation misses the L1 cache and requires a cache fill, it must then wait until it becomes non-speculative. This approach is faster than preventing all memory speculation but does require the processing system to stop itself when it realizes that speculation must cease. This is similar to how a memory load executes speculatively, but upon discovering that it is a non-cacheable access, the memory load waits until it becomes non-speculative.

In option 3, dependency tracking is used to stop speculation selectively when an observable side effect is expected to occur. However, instead of waiting until the operation becomes non-speculative, the operation waits until the dangerous data it is using becomes non-dangerous. While this can be implemented in different ways in different embodiments, some embodiments involve the tracking dependencies as part of the taint/danger tracking logic in a renamer or architectural state map. Whenever a register is marked dangerous, it is also marked with the reorder buffer (ROB) entry number of the instruction that must retire before the register can be considered non-dangerous, e.g., tainted or normal. This ROB entry number (or tag) is generically referred to as the WaitRetTag and refers to the ROB tag that must be detected in order to cause a state transition or allow speculation. If an entry is not waiting on a specific retirement, WaitRetTag is set to INVALID TAG.

In some embodiments, a total of four states are available for each architectural register, as shown in Table 1:

TABLE 1

| State | Description | WaitRetTag valid? | Action on seeing WaitRetTag retire |
|---|---|---|---|
| NORMAL | Register is safe | No | — |
| TAINTED | Register is tainted | Maybe | Go to NORMAL |
| DANGER | Register is dangerous | Always | Go to TAINTED |
| CLRDANGER | Register is dangerous, but about to be cleared | Always | Go to NORMAL |

The states of the architectural registers are tracked using the renamer or architectural state map, such as the renamer 216 and the architectural state map 222 shown in FIG. 2. The clear-danger state is used when a "clear taint" instruction is executed so that the speculative "clear taint" instruction does not cause the processing system more processor core to serialize.

Figure 6:
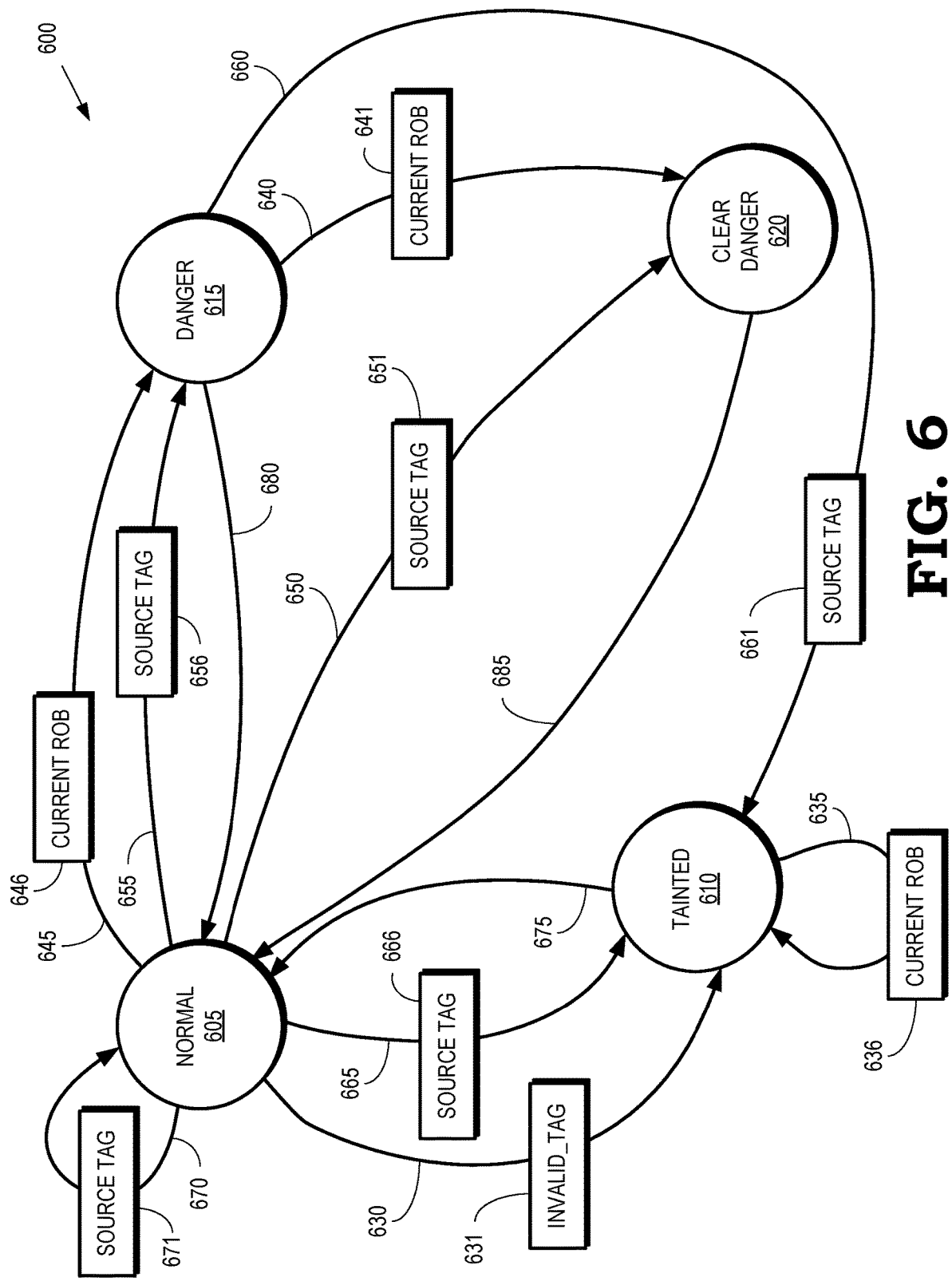
FIG. 6 is a block diagram of a state machine that controls transitions of the state of an architectural register between normal state, a tainted state, a danger state, and a clear-danger state according to some embodiments.

FIG. 6 is a block diagram of a state machine 600 that controls transitions of the state of an architectural register between normal state 605, a tainted state 610, a danger state 615, and a clear-danger state 620 according to some embodiments. The state machine 600 is implemented in some embodiments of the processing system 100 shown in FIG. 1 and the processor core 200 shown in FIG. 2. A separate copy of the state machine 600 is applied to each architectural register. The state machine 600 determines state transitions and the corresponding values of a tag (e.g., the WaitRetTag) that indicates an operation that is awaiting retirement.

If a "set taint" instruction is applied to the architectural register while the architectural register is in the normal state 605, the state machine 600 transitions to the taint state 610, as indicated by the arrow 630. The state machine 600 also sets the value of the tag to "invalid," as indicated in the box 631.

If a "clear taint" instruction is applied to the architectural register, the state machine 600 determines if the architectural register is already in the tainted state 610. If so, the state machine 600 leaves the architectural register in the tainted state (as indicated by the arrow 635) and sets the value of the tag to the value of the current ROB tag, i.e., the tag of the "clear taint" instruction in the ROB indicated by the box 636.

If the "clear taint" instruction is applied to the architectural register while in the danger state 615, the state machine 600 sets the state of the architectural register to the clear-danger state 620, as indicated by the arrow 640. The state machine 600 also sets the value of the tag to the current ROB tag, as indicated by the box 641.

The state machine 600 takes no action if the "clear taint" instruction is applied to the architectural register while the architectural register is not in the tainted state 610 or the danger state 615.

If the instruction is a memory load instruction to load information from a memory location into the architectural register, the state machine 600 determines if any of the source registers are in the danger state 615. If so, the state machine 600 sets the state of the architectural register to the danger state 615, as indicated by the arrow 645. The state machine 600 sets the value of the tag to the current ROB tag, as indicated by the box 646.

If the instruction is a memory load instruction and any of the source registers are marked as being in the tainted state 610 with an invalid tag, the state machine 600 sets the state of the architectural register to the danger state 615, as indicated by the arrow 645, and sets the value of the tag to the current ROB tag, as indicated by the box 646.

Otherwise, if any of the sources to the memory load instruction are not in the normal state 605, the state of the architectural register is set to the clear-danger state 620, as indicated by the arrow 650. The value of the tag is copied from the value of the tag for the source register, as indicated by the box 651. If both of the source registers are not in the normal state 605, the youngest tag is used because there is only a single tag for each architectural register. Using the youngest valid tag guarantees that both instructions have retired if the architectural register waits on more than one source register to change state. This applies if either of the source registers is in the clear-danger state 620 or in the tainted state 610 with a valid tag. Otherwise, the state machine 600 sets the state of the architectural register to the normal state 605.

If the instruction is not a "set taint," "clear taint," or memory load instruction, the tag is set to the youngest valid tag of any source register for the instruction. If any of the source registers are marked as being in the danger state 615, the state machine 600 sets the state of the architectural register to the danger state 615, as indicated by the arrow 655, and sets the tag to the value of the youngest source register, as indicated by the box 656.

If any of the source registers are marked as being in the clear-danger state 620, the state machine 600 examines the state of the other source register for the instruction. If the other source is in the normal state 605 or the clear-danger state 620, the state machine 600 changes the state of the architectural register to the clear-danger state 620, as indicated by the arrow 650, and sets the value of the tag to the youngest valid tag, as indicated by the box 651. If the other source is in the tainted state 610 and the tag is valid, the state machine 600 sets the state of the architectural register to the clear-danger state 620, as indicated by the arrow 650, and sets the value of the tag to the youngest valid tag, as indicated by the box 651. However, if the other source is in the tainted state 610 and the tag is invalid, the state machine 600 changes the state of the architectural register to the danger state 615, as indicated by the arrow 655, so that the state of the architectural register changes to the tainted state 610, as indicated by the arrow 660, and the tag is set to the youngest valid source, as indicated by the box 661.

If any of the source registers are marked as being in the tainted state 610, the state machine 600 sets the state of the architectural register to the tainted state 610, as indicated by the arrow 665, and the tag is set to the youngest valid source, as indicated by the box 666. Otherwise, the state machine 600 sets the state of the architectural register to the normal state 605, as indicated by the arrow 670, and the tag is set to the youngest valid source, as indicated by the box 671.

When the instruction retires, the state machine 600 sets the state of the architectural register to the normal state 605, as indicated by the arrows 675, 680, 685. When instructions retire, the relevant ROB tag is sent to any units waiting on this information, such as the load/store unit 214 shown in FIG. 2. Once the relevant ROB tag has been seen via this retire-time broadcast, any pending operation is considered eligible to proceed. Moreover, in response to retirement of the instruction, the tags for the entries (architectural registers) in the architectural register map are compared against the currently retiring entry and the appropriate state transitions take place, as discussed herein. In some embodiments, the state machine 600 tracks physical register file (PRF) entry numbers of relevant entries instead of ROB tags. However, ROB tags are more efficient and avoid the need to potentially track multiple tags for instructions that use multiple dangerous sources.

The following code fragment in Table 2 is an example of taint tracking:

TABLE 2

| Code | Taints |
|---|---|
| MOV RAX, [RAX] | — |
| SETTAINT RAX | RAX |
| ADD RBX, RAX | RAX, RBX |
| MOV RCX, [RBX] | RAX, RBX, RCX |
| CLRTAINT RBX | RAX, RCX |
| MOV RDX, [RBX] | RAX, RCX |
| ADD RDX, RAX | RAX, RCX, RDX |
| XOR RAX, RAX | RCX, RDX |
| MOV RDX, [RSI] | RCX |

In the following example, in option 1, instruction 5 cannot execute until it is non-speculative because it uses a dangerous value (RDX). In option 2 shown in Table 3, instruction 5 can execute unless it requires an observable behavior (e.g. cache fill).

TABLE 3

| Code | Taints | Dangers |
|---|---|---|
| 1: SETTAINT RAX | RAX | — |
| 2: SETTAINT RBX | RAX, RBX | — |
| 3: MOV RCX, [RAX + RBX] | RAX, RBX | RCX |
| 4: ADD RDX, RCX | RAX, RBX | RCX, RDX |
| 5: MOV RAX, [RDX + RAX] | RBX | RCX RDX RAX |
| (Instructions 1-3 retire) | RBX, RCX, RDX | RAX |
| (Instructions 4-5 retire) | RAX, RBX, RCX, RDX | — |

In first example of option 3 shown in Table 4, the processing system assumes WaitRetTag tracking. In this example, instruction 5 can execute either if it does not require an observable side effect or once instruction 3 retires because at that point the instruction that wrote the dangerous value RCX (WaitRetTag=3) has retired.

TABLE 4

| ROBEntry: Code | DangerRetTag | Taints | Dangers |
|---|---|---|---|
| 1: SETTAINT RAX | — | RAX | — |
| 2: SETTAINT RBX | — | RAX, RBX | — |
| 3: MOV RCX, [RAX + RBX] | — | RAX, RBX | RCX (WaitRetTag = 3) |
| 4: ADD RDX, RCX | — | RAX, RBX | RCX (WaitRetTag = 3) RDX (WaitRetTag = 3) |
| 5: MOV RAX, [RDX + RAX] | 3 | RBX | RCX (WaitRetTag = 3) RDX (WaitRetTag = 3) RAX (WaitRetTag = 5) |
| (Instructions 1-3 retire) | — | RBX, RCX, RDX | RAX (WaitRetTag = 5) |
| (Instructions 4-5 retire) | — | RAX, RBX, RCX, RDX | — |

In a second example of option 3 shown in Table 5, instruction 5 must wait until instruction 3 retires before it can cause a side effect. Instruction 7 must also wait until instruction 3 retires. Instruction 8 must wait until instruction 7 retires (if it needs a side effect).

TABLE 5

| ROBEntry: Code | DangerRetTag | Taints | Dangers |
|---|---|---|---|
| 1: SETTAINT RAX | — | RAX | — |
| 2: ADD RBX, RAX | — | RAX, RBX | — |
| 3: MOV RSI, [RBX + RAX] | — | RAX, RBX | RSI (WaitRetTag = 3) |
| 4: XCHG RSI, RDI | — | RAX, RBX | RDI (WaitRetTag = 3) |
| 5: MOV RAX, [RDI + RAX] | 3 | RBX | RDI (WaitRetTag = 3) RAX (WaitRetTag = 5) |
| 6: SUB RCX, RAX | — | RBX | RDI (WaitRetTag = 3) RAX (WaitRetTag = 5) RCX (WaitRetTag = 5) |
| 7: MOV RDX, [RDI] | 3 | RBX | RDI (WaitRetTag = 3) RAX (WaitRetTag = 5) RCX (WaitRetTag = 5) RDX (WaitRetTag = 7) |
| 8: XCHG RAX, [RDX] | 7 | RBX | RDI (WaitRetTag = 3) RCX (WaitRetTag = 5) RDX (WaitRetTag = 7) RAX (WaitRetTag = 8) |
| (Instructions 1-3 retire) | — | RBX, RSI, RDI | RCX (WaitRetTag = 5) RDX (WaitRetTag = 7) RAX (WaitRetTag = 8) |
| (Instructions 4-5 retire) | — | RBX, RSI, RDI, RCX | RDX (WaitRetTag = 7) RAX (WaitRetTag = 8) |
| (Instructions 6-8 retire) | — | RBX, RSI, RDI, RAX, RCX, RDX | |

In a third example of option 3 shown in Table 6, the state of the MAP is shown as instructions are seen at dispatch time. For simplicity, this example is restricted to only RAX/RBX/RCX/RDX. Each MAP entry is listed as <State>/<WaitRetTag>

TABLE 6

| ROBEntry: Code | MAP[RAX] | MAP[RBX] | MAP[RCX] | MAP[RDX] |
|---|---|---|---|---|
| 1: SETTAINT RAX | TAINTED/— | NORMAL/— | NORMAL/— | NORMAL/— |
| 2: MOV RAX, [RAX + RBX] | DANGER/2 | " | " | " |
| 3: ADD RDX, RAX | " | " | " | DANGER/2 |
| 4: CLRTAINT RDX | " | " | " | CLRDANGER/4 |
| 5: MOV RCX, [RDX] | " | " | CLRDANGER/4 | " |
| 6: SETTAINT RBX | " | TAINTED/— | " | " |
| 7: XOR RAX, RAX | NORMAL/— | " | " | " |
| 8: MOX RBX, [RAX + RBX] | " | DANGER/8 | " | " |
| 9: MOV RBX, RAX | " | NORMAL/— | " | " |
| (Instructions 1-4 retire) | " | " | NORMAL/— | NORMAL/— |

In a fourth example of option 3 shown in Table 7, a dispatch-time state of the MAP is shown for RAX/RBX/RCX/RDX.

TABLE 7

| ROBEntry: Code | MAP[RAX] | MAP[RBX] | MAP[RCX] | MAP[RDX] |
|---|---|---|---|---|
| 1: SETTAINT RAX | TAINTED/— | NORMAL/— | NORMAL/— | NORMAL/— |
| 2: ADD RBX, RAX | " | TAINTED/— | " | " |
| 3: CLRTAINT RBX | " | TAINTED/3 | " | " |
| 4: MOV RCX, [RBX] | " | " | CLRDANGER/3 | " |
| 5: XOR RDX, RCX | " | " | " | CLRDANGER/3 |
| 6: MOV RAX, [RDX] | CLRDANGER/3 | " | " | " |
| (Instructions 1-3 retire) | NORMAL/— | NORMAL/— | NORMAL/— | NORMAL/— |

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    changing a state of a first architectural register in a processing system from a first state to a second state that indicates that the first architectural register is to be monitored during speculative execution;
    associating a second architectural register in the processing system with a third state in response to the first architectural register being a source register for a memory load instruction that loads data from a memory into the second architectural register during speculative execution; and
    constraining use of data in the second architectural register during speculative operations while the second architectural register is in the third state.

2. The method of claim 1, wherein changing the state of the first architectural register comprises changing the state of the first architectural register using a "set taint" instruction.

3. The method of claim 1, wherein use of data in the first architectural register is unconstrained during speculative execution while the first architectural register is in the second state.

4. The method of claim 1, wherein constraining the use of the data in the second architectural register comprises preventing use of the data in the second architectural register in at least one speculative operation that causes at least one side effect that produces at least one state change in the processing system that is not undone or reverted by a pipeline flush.

5. The method of claim 1, wherein the second architectural register is a source for an instruction, further comprising:
    propagating the third state of the second architectural register to a third architectural register that is a destination of the instruction.

6. The method of claim 1, further comprising:
    retiring the memory load instruction; and
    changing the state of the second architectural register to the second state in response to retirement of the memory load instruction.

7. The method of claim 6, further comprising:
    using data in the second architectural register in at least one speculative operation in response to the second architectural register transitioning to the second state.

8. The method of claim 6, further comprising:
    associating the second architectural register with a number of an entry in a reorder buffer associated with the first architectural register in response to the second architectural register transitioning to the third state, wherein the number indicates the memory load instruction.

9. The method of claim 8, wherein changing the state of the second architectural register to the second state comprises detecting a signal representative of the number in response to retiring the memory load instruction.

10. The method of claim 1, further comprising:
    receiving a first instruction to change the state of the second architectural register to the first state;
    changing the state of the second architectural register to a fourth state in response to receiving the first instruction; and
    changing the state of the second architectural register from the fourth state to the first state in response to the first instruction retiring.

11. A processing system, comprising:
a set of architectural registers including a first architectural register and a second architectural register; and
a processor core configured to:
change a state of the first architectural register from a first state to a second state that indicates that the processor core is to monitor the first architectural register during speculative execution,
associate the second architectural register with a third state in response to the first architectural register being a source register for a memory load instruction that loads data from a memory into the second architectural register during speculative execution, and
constrain use of data in the second architectural register during speculative operations while the second architectural register is in the third state.

12. The processing system of claim 11, wherein the processor core is further configured to change the state of the first architectural register from the first state to the second state using a first instruction.

13. The processing system of claim 11, wherein the processor core is further configured to use data in the first architectural register without constraint during speculative execution while the first architectural register is in the second state.

14. The processing system of claim 11, wherein the processor core does not use the data in the second architectural register in at least one speculative operation that causes at least one side effect that produces at least one state change in the processing system that is not undone or reverted by a pipeline flush.

15. The processing system of claim 11, wherein:
the second architectural register is a source for an instruction;
the processor core is further configured to propagate the third state of the second architectural register to a third architectural register that is a destination of the instruction; and
the third architectural register is in the set of architectural registers.

16. The processing system of claim 11, wherein the processor core is further configured to retire the memory load instruction and change the state of the second architectural register to the second state in response to retirement of the memory load instruction.

17. The processing system of claim 16, wherein the processor core is further configured to use data in the second architectural register in at least one speculative operation in response to the second architectural register transitioning to the second state.

18. The processing system of claim 16, wherein the processor core is further configured to associate the second architectural register with a number of an entry in a reorder buffer associated with the first architectural register in response to the second architectural register transitioning to the third state, wherein the number indicates the memory load instruction.

19. The processing system of claim 18, further comprising:
a renamer configured to generate a signal representative of the number in response to retiring the memory load instruction, and
wherein the processor core is further configured to change the state of the second architectural register to the second state in response to detecting the signal generated by the renamer.

20. The processing system of claim 11, wherein the processor core is further configured to:
execute a second instruction to change the state of the second architectural register to the first state;
change the state of the second architectural register to a fourth state in response to receiving the second instruction; and
change the state of the second architectural register to the first state in response to the second instruction retiring.

21. A reorder buffer, comprising:
a plurality of entries that map architectural registers to physical registers in a processing system; and
a data structure configured to store information indicating state of the architectural registers, wherein the state comprises a first state, a second state that indicates that a corresponding architectural register is to be monitored during speculative execution, a third state that indicates that use of data in the corresponding architectural register is constrained during speculative operations, and a fourth state indicating that the state of the corresponding architectural register changes from the fourth state to the first state in response to retirement of a "clear taint" instruction that operates on the corresponding architectural register.

22. The reorder buffer of claim 21, wherein:
a first architectural register is associated with a number of an entry in the reorder buffer;
the number is associated with a second architectural register in response to the first architectural register transitioning to the third state; and
the number indicates a memory load instruction.

* * * * *